US009366047B2

(12) United States Patent  (10) Patent No.: US 9,366,047 B2
Pettit  (45) Date of Patent: Jun. 14, 2016

(54) POOL SKIMMER BASKET

(71) Applicant: Steven Pettit, Glendale, AZ (US)

(72) Inventor: Steven Pettit, Glendale, AZ (US)

(*) Notice: Subject to any disclaimer, the term of this patent is extended or adjusted under 35 U.S.C. 154(b) by 0 days.

(21) Appl. No.: 14/296,904

(22) Filed: Jun. 5, 2014

(65) Prior Publication Data

US 2015/0354241 A1  Dec. 10, 2015

(51) Int. Cl.
*E04H 4/12* (2006.01)
*B01D 29/35* (2006.01)
*C02F 103/42* (2006.01)
*B01D 29/11* (2006.01)

(52) U.S. Cl.
CPC ............ *E04H 4/1272* (2013.01); *B01D 29/117* (2013.01); *B01D 29/35* (2013.01); *E04H 4/1218* (2013.01); *C02F 2103/42* (2013.01)

(58) Field of Classification Search
CPC . E03F 5/06; E03F 2005/061; E03F 2005/065; E03F 2005/063; A01K 77/00; B01D 29/117; B01D 29/66; B01D 21/0012; B01D 29/27; B01D 29/23; C02F 2103/42; C02F 2103/00
USPC .............................................. 210/167.19, 923
See application file for complete search history.

(56) References Cited

U.S. PATENT DOCUMENTS

| | | | | |
|---|---|---|---|---|
| 3,091,340 A * | 5/1963 | Pansini | ................. | E04H 4/1236 210/167.16 |
| 4,445,295 A * | 5/1984 | Litrico | ................... | A01K 69/06 43/100 |
| 4,448,686 A * | 5/1984 | Friedman | ............ | A47J 37/1223 210/238 |
| 4,459,209 A * | 7/1984 | Broadwater | .......... | E04H 4/1236 210/167.16 |
| 5,207,017 A * | 5/1993 | Litrico | ................... | A01K 69/10 43/100 |
| 6,537,447 B2 | 3/2003 | Remon | | |
| 6,592,756 B1 * | 7/2003 | Felix, Jr. | ................ | B01D 29/23 D29/23 |
| 6,618,978 B1 * | 9/2003 | Miranowski | ........... | A01K 97/01 43/4 |
| 6,786,000 B1 * | 9/2004 | Hong | ...................... | A01K 69/10 43/105 |
| 6,907,689 B2 * | 6/2005 | Pendzimas | ............. | A01K 97/01 43/4 |
| 7,018,439 B2 * | 3/2006 | Vuijk | .................... | A47L 9/1625 55/429 |
| 7,186,283 B2 * | 3/2007 | Vuijk | .................... | A47L 9/1625 15/352 |
| 7,640,624 B2 * | 1/2010 | Crouch | ................... | A47L 5/365 15/352 |
| 7,892,242 B2 * | 2/2011 | Goldstein | ............ | A61B 17/221 606/110 |
| 8,402,599 B2 * | 3/2013 | Charlton | ............... | A47L 9/1666 15/352 |
| 8,533,903 B2 * | 9/2013 | Muhlenkamp | ........ | A47L 9/1683 15/352 |
| 8,647,504 B2 * | 2/2014 | Vogtner | ................ | E04H 4/1272 210/167.1 |

* cited by examiner

*Primary Examiner* — Krishnan S Menon
*Assistant Examiner* — Waqaas Ali
(74) *Attorney, Agent, or Firm* — Schmeiser, Olsen & Watts LLP

(57) ABSTRACT

A pool skimmer basket is provided and includes a top member having an opening for receiving and capturing debris into the pool skimmer basket and a base member having a plurality of apertures. It also includes a collapsible basket portion couples between the top member and the base member and an emptying device operatively coupled between the base member and the top member. The pool skimmer basket is moveable between an extended and collapsed position in response to operation of the emptying device. It also includes a handle coupled to the emptying device and a locking device operatively coupled to the handle, wherein the locking device is moveable between and locked and an unlocked position. The pool skimmer basket is moveable into the collapsed position when the locking device is in the unlocked position and retained in the extended position when the locking device is moved into the locked position.

8 Claims, 11 Drawing Sheets

POOL SKIMMER BASKET

BACKGROUND OF THE INVENTION

1. Technical Field

This invention relates generally to a pool skimmer basket and more particularly to a pool skimmer basket with a handle and emptying device.

2. State of the Art

There are various ways for cleaning and maintaining a pool, and often times multiple means for cleaning and maintaining a pool are used in conjunction with one another in order to prevent debris and particles from entering the pool filtration system. One of these cleaning means includes the use of a pool skimmer basket.

Conventional pool skimmer baskets are small and sit at the bottom of the skimmer body unit. The size of a conventional skimmer basket limits the amount of material it can hold. If the skimmer basket is not heavy enough there can also be issues of the skimmer basket floating to the surface of the water and losing its effectiveness all together. Conventional skimmer baskets also have the issue of deterring air flow if the basket and/or skimmer body becomes clogged with debris. Without adequate air flow the pool filtration system and motor can become damaged. The place where the skimmer basket seats at the bottom of the skimmer body means the debris floats above the basket and thus may not be captured by the basket. Further, an individual attempting to empty a current skimmer basket must reach through the water and floating debris to grab hold of the basket handle and lift it towards the surface. While lifting the skimmer basket for emptying, the floating debris is dispersed back into the water within the skimmer body and many times back into the pool. When emptying the skimmer basket the individual must reach through the debris and many times scoop the captured debris out of the skimmer basket manually. This debris can include leaves and other natural waste as well as both living and dead bugs and small animals. When returning a current skimmer basket to the skimmer body the individual is required to manually return the basket back through the water and remaining debris to properly seat the basket. Many times the remaining debris is caught underneath the skimmer basket and ultimately gets sucked further into the system causing clogs and damage to more expensive components of the pools filtration system.

Accordingly, there is a need in the field of pool skimmer baskets for an improved pool skimmer basket.

SUMMARY OF EMBODIMENTS OF THE INVENTION

The present invention relates to a pool skimmer basket comprising a top member, a base member and a collapsible basket portion coupled between the top member and the base member. The pool skimmer basket further includes a vented handle for lifting the skimmer basket out of a skimmer body and providing proper airflow to the pools filtration system. The handle then becomes operational with the ability to release and empty the contents collected within the skimmer basket with the click of a button.

An embodiment may include a pool skimmer basket comprising a top member having an opening for receiving debris into the pool skimmer basket and a vented backstop for containing the debris; a base member having a plurality of apertures; a collapsible basket portion couples between the top member and the base member; and an emptying device operatively coupled between the base member and the top member. The pool skimmer basket is moveable between an extended and a collapsed position in response to operation of the emptying device. The pool skimmer basket may comprise a vented handle coupled to the emptying device, wherein the handle operates to lift the pool skimmer basket. The pool skimmer basket may also comprise a locking device, wherein the locking device is moveable between and locked and an unlocked position and the pool skimmer device is moveable into the collapsed position when the locking device is in the unlocked position and retained in the extended position when the locking device is moved into the locked position and engages the top member of the pool skimmer basket. The extended position comprises the base member is retained a predetermined distance away from the top member.

In embodiments, the emptying device comprises a first vented shaft coupled to a second vented shaft at a predetermined angle, wherein a first end of the emptying device is rotatably coupled to a bracket of the base member and a second end of the emptying device is coupled to the handle. The top member may comprise a shaft aperture, wherein the first shaft of the emptying device is slideable through the aperture. The pool skimmer basket is moveable between the extended and collapsed positions in response to the first shaft sliding through the shaft aperture. As the base member is moved toward the top member by sliding the first shaft through the shaft aperture, the base member is rotated toward the opening of the top member.

An embodiment may include a method of using a pool skimmer basket. The method comprises collecting debris within a pool skimmer basket; moving a locking device to an unlocked position; sliding an emptying device to move the pool skimmer basket to a collapsed position; emptying the debris from within the pool skimmer basket through an opening in a top member by angling a base member toward the opening; and sliding the emptying device to move the pool skimmer basket into an extended position.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
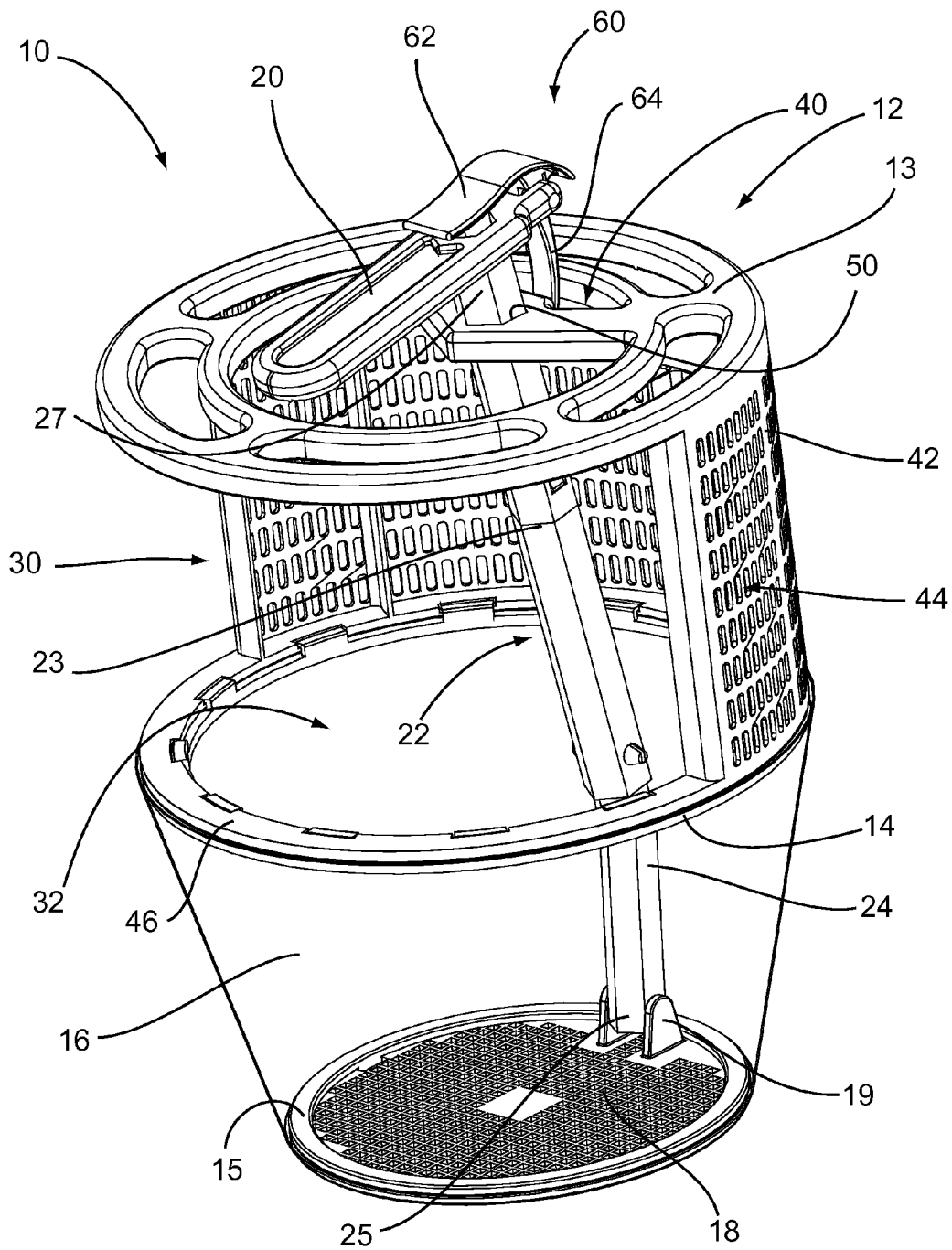
FIG. 1 is a perspective view of a pool skimmer basket.
Figure 2:
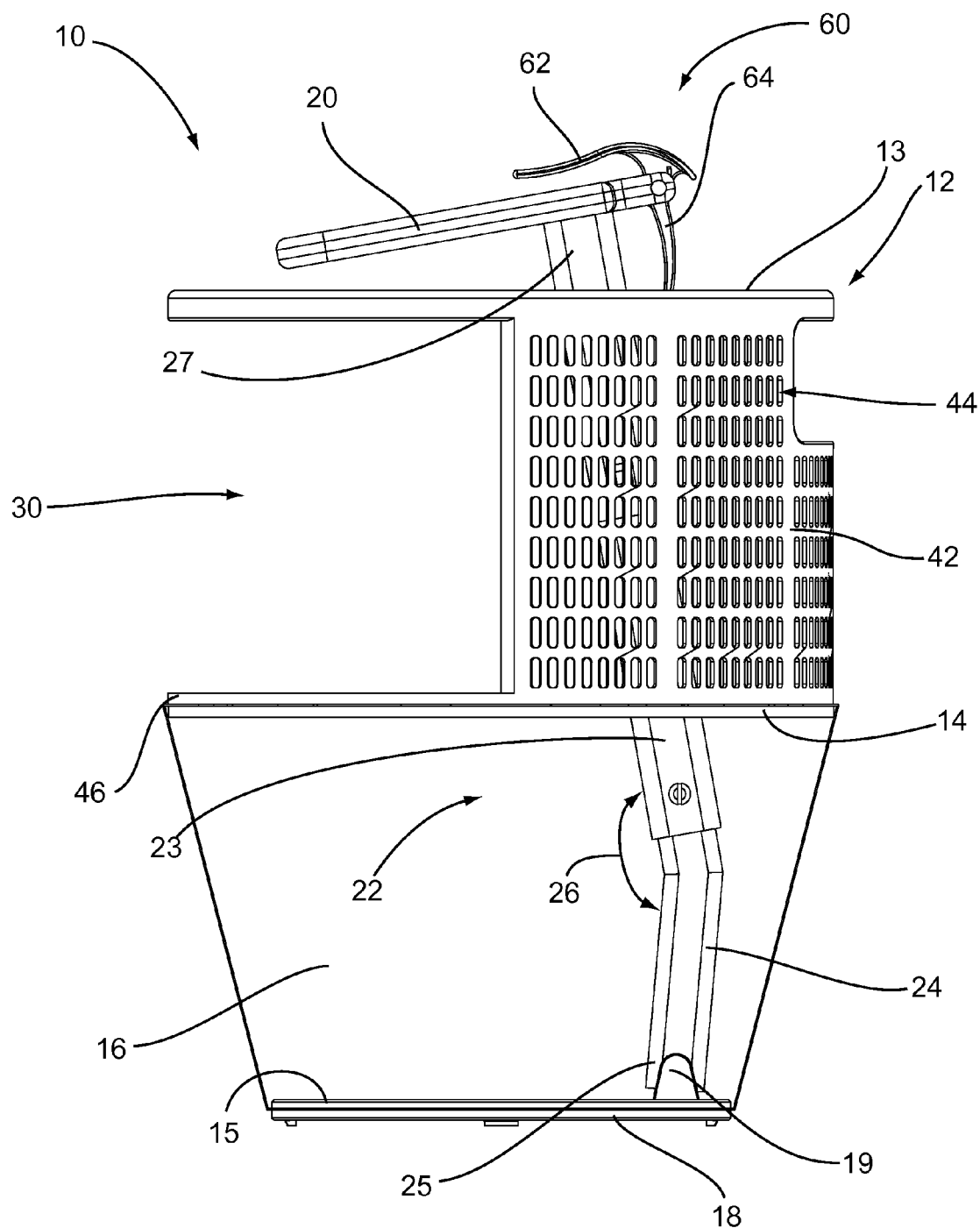
FIG. 2 is a side view of a pool skimmer basket.
Figure 3:
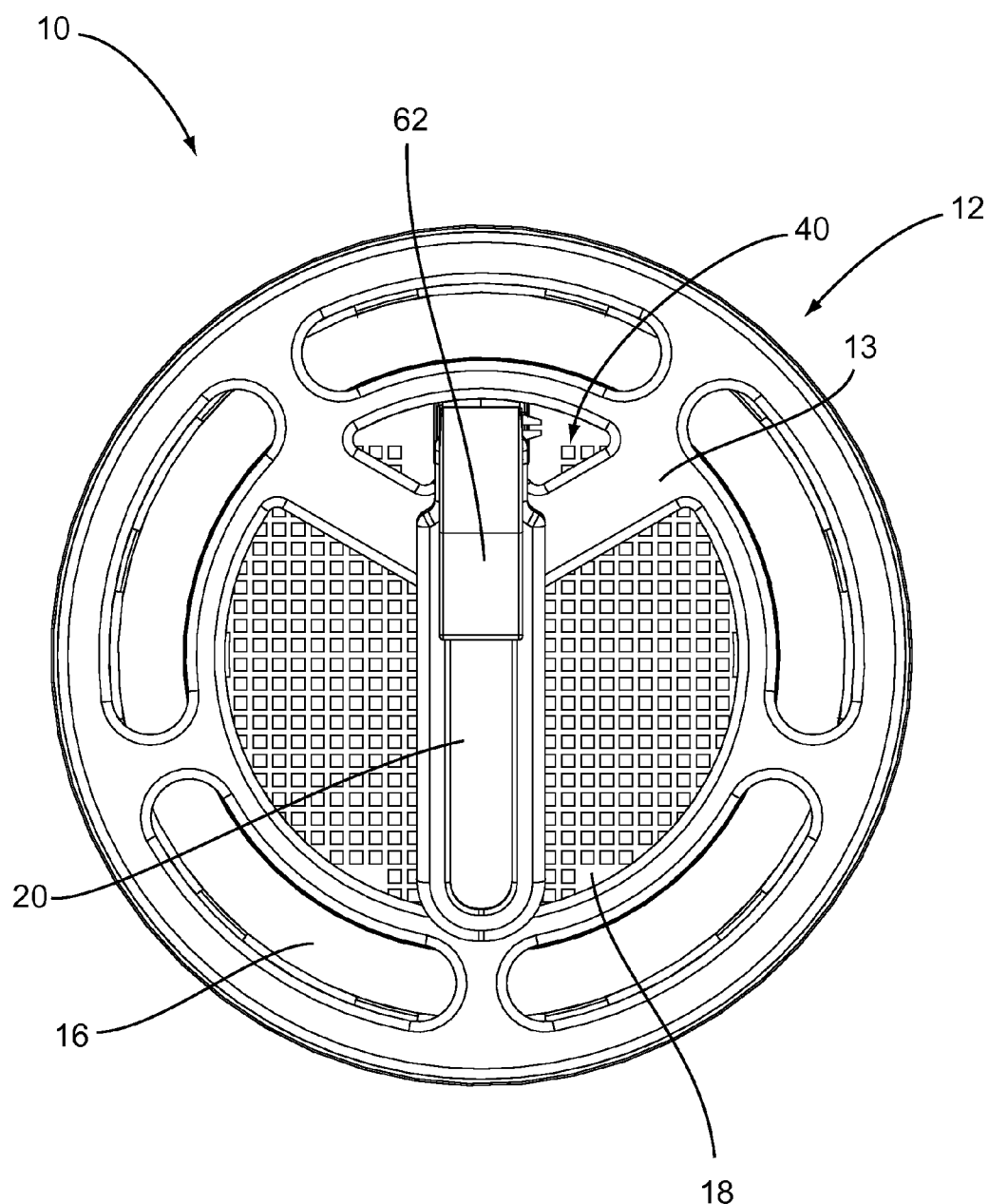
FIG. 3 is a top view of pool skimmer basket.
Figure 4:
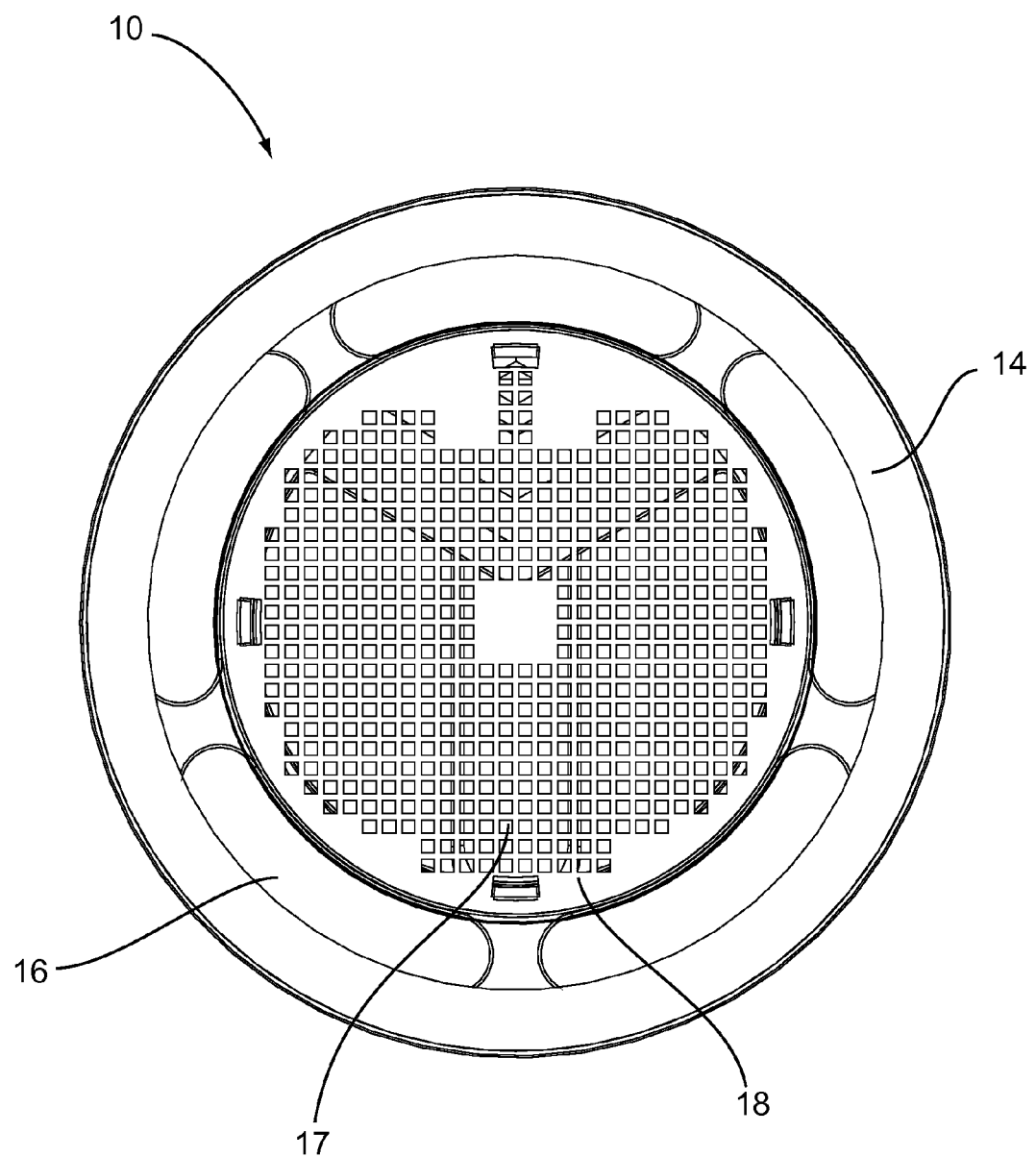
FIG. 4 is a bottom view of a pool skimmer basket.
Figure 5:
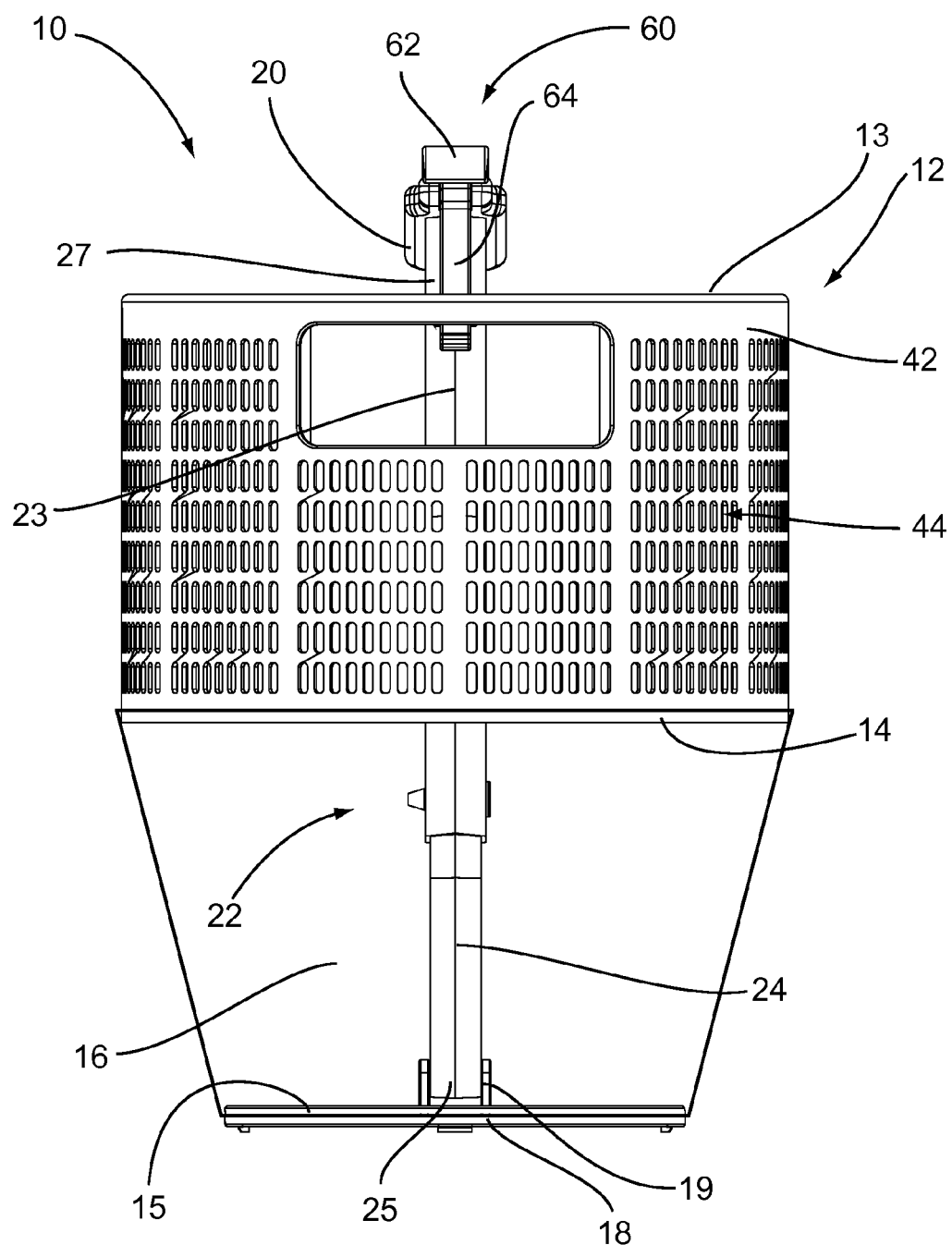
FIG. 5 is a back view of a pool skimmer basket.
Figure 6:
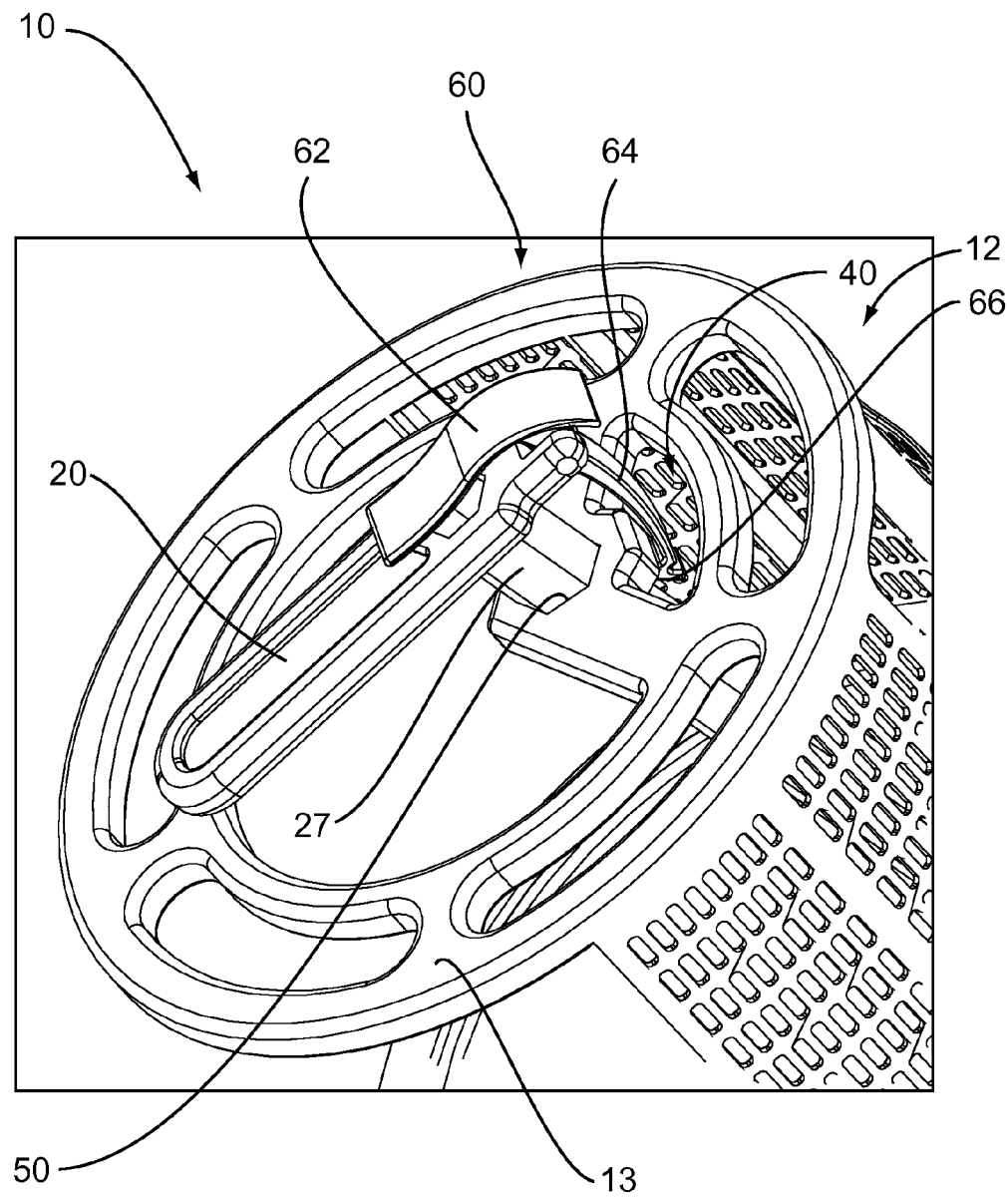
FIG. 6 is a perspective view of a top member of a pool skimmer basket.
Figure 7:
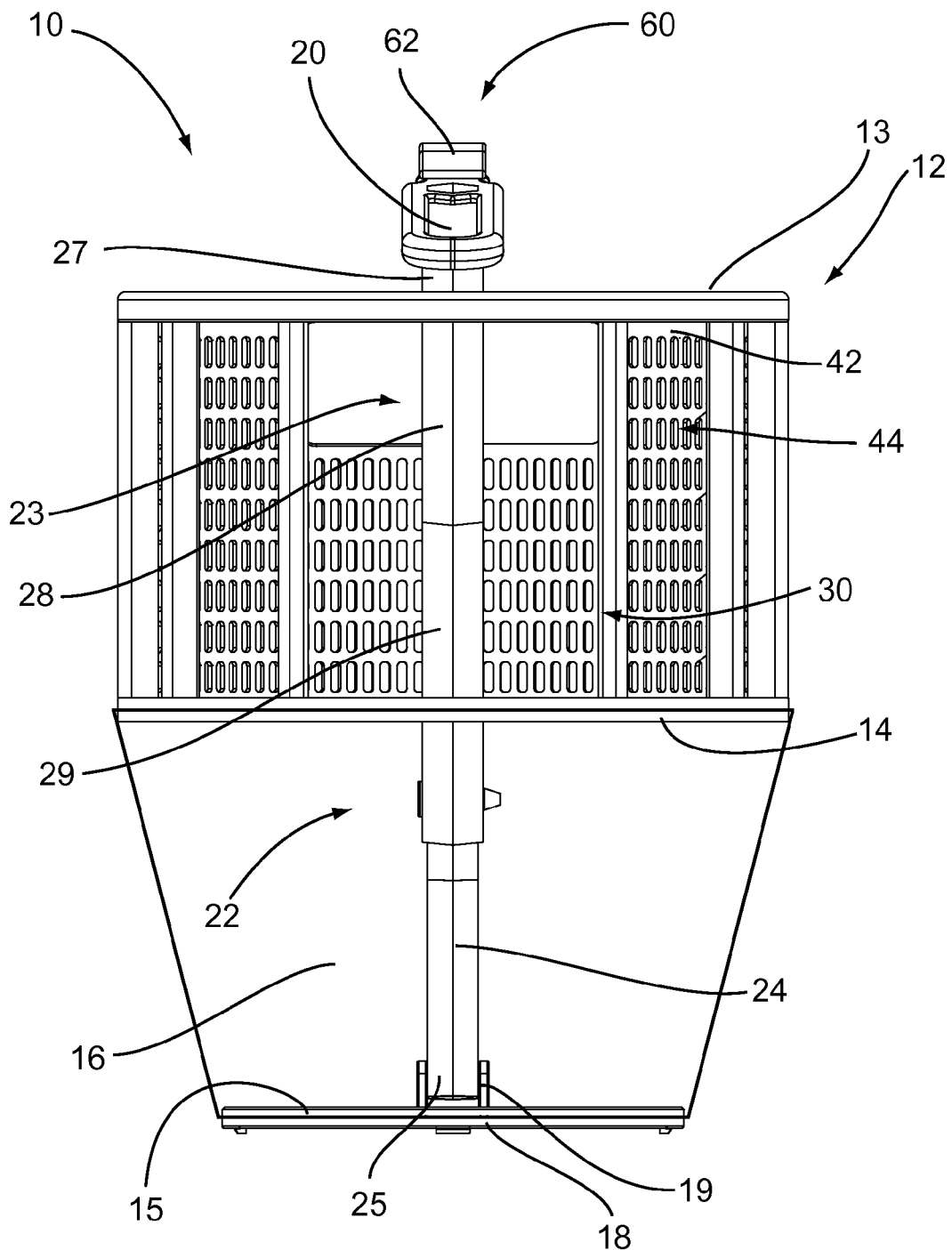
FIG. 7 is a front view of a pool skimmer basket.
Figure 8:
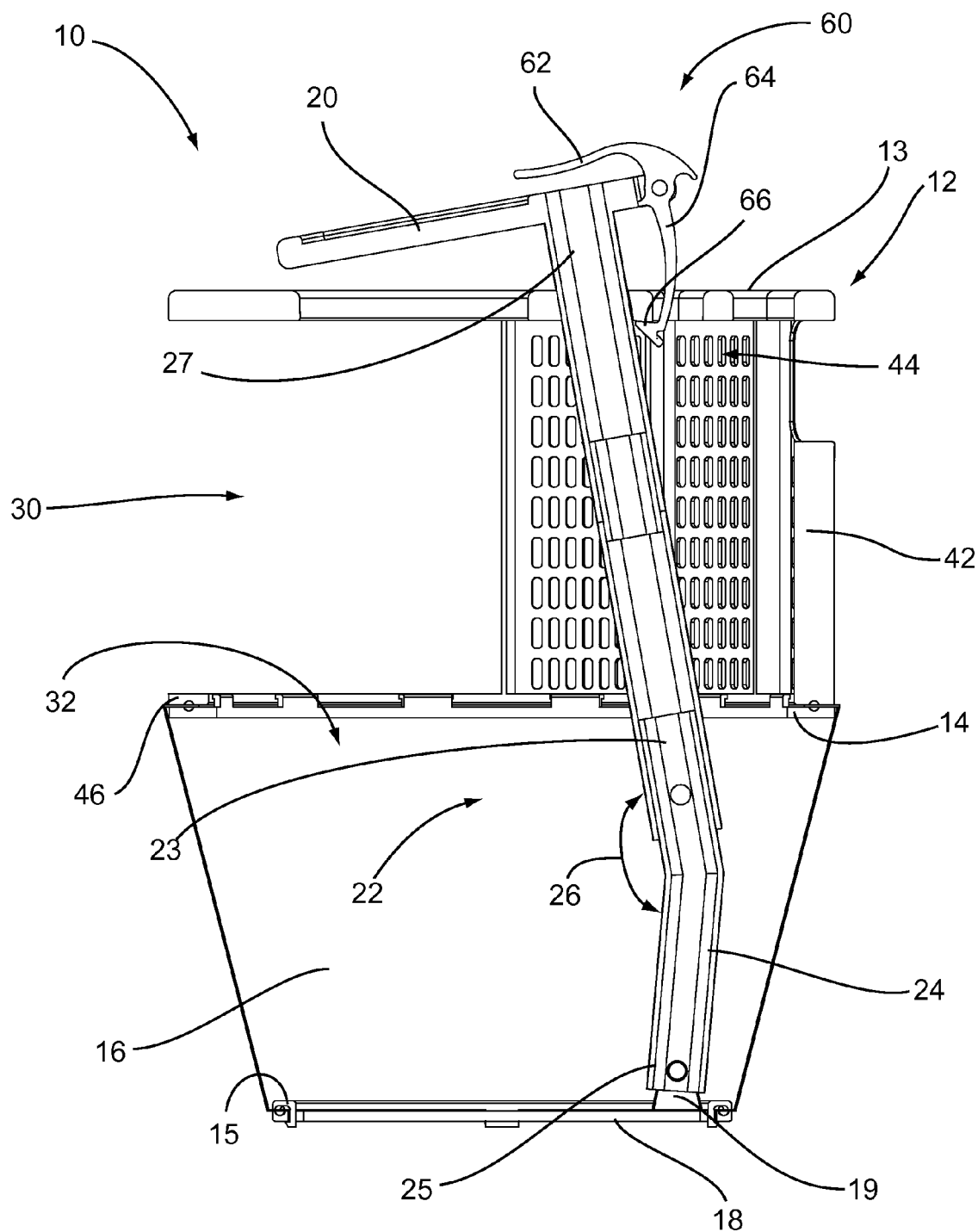
FIG. 8 is a side section view of a pool skimmer basket.
Figure 9:
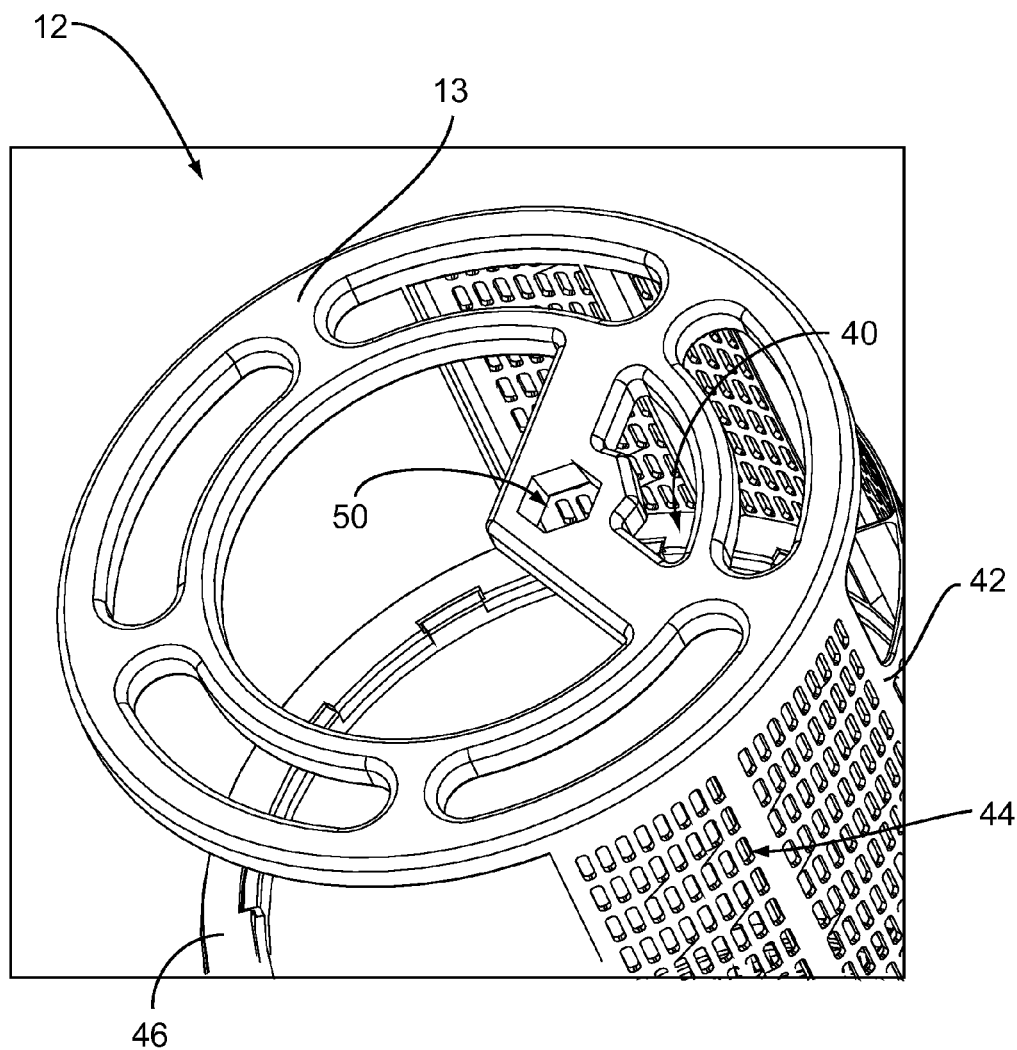
FIG. 9 is a perspective view of a top member of a pool skimmer basket without showing a handle and emptying device.

As discussed above, embodiments of the present invention relate to a pool skimmer basket comprising a top member, a base member and a collapsible basket portion coupled between the top member and the base member. The pool skimmer basket further includes a vented handle for lifting the skimmer basket out of a skimmer body and then operational to empty the contents collected within the skimmer basket.

Referring to the drawings, FIGS. 1-9 depict an embodiment of a pool skimmer basket 10. The skimmer basket 10 comprises a top member 12, a basket portion 16, a base member 18 and a handle 20. The basket portion 16 is coupled between the top member 12 and the base member 18.

The top member 12 may be formed of a rigid material, wherein the rigid material holds its form and is resistant to wear from water and particularly to chemically treated water, such as chlorinated water and the like. The top member 12 includes a top surface 13 having a plurality of apertures 40 in the top the surface 13. The top member 12 may further include a side member 42 with a plurality of apertures 44 within the side surface 42. The top member 12 may also include a bottom surface 46, wherein the bottom surface 46 is ring shaped with an aperture 32 extending there through. The top member 12 may include an opening 30, wherein the opening 30 extends through the side surface 42 of the top member between the top surface 13 and the bottom surface 46.

The base member 18 may have a plurality of apertures 17, wherein the plurality of apertures 17 allow for water to flow through the apertures, but not debris collected within the pool skimmer basket 10. The base member 18 may also comprise a bracket 19. The bracket 19 is configured to operationally couple to an emptying device 22. The emptying device 22 may comprise a first vented shaft 23 coupled to a second vented shaft 24, wherein the first shaft 23 is at an angle 52 with the second shaft 24. The emptying device 22 includes a first end 25 and a second end 27. The first end 25 of the emptying device 22 is rotatably coupled to the bracket 19 of the base member 18. The second end 27 of the emptying device 22 is coupled to the handle 20. The first shaft 23 of the emptying device 22 extends through a shaft aperture 50 that extends through the top surface 13 of the top member 12. The first shaft 23 is slideable through aperture 50 of the top surface of the top member.

The basket portion 16 is coupled between the top member 12 and the base member 18. In some embodiments, the basket portion 16 is coupled to the top member 12 by use of an attachment ring 14. The attachment ring 14 may be coupled to the top member 12 and function to secure the basket portion 16 between the attachment ring 14 and the top member 12 (shown in FIG. 8). In some embodiments, the skimmer basket 10 may include a base attachment ring 15. The base attachment ring 15 may be coupled to the base member 18 and function to secure the basket portion 16 between the base attachment ring 15 and the base member 18. Further, in some embodiments, the basket portion 16 is collapsible, such as but not limited to a mesh or other permeable material that is flexible. The basket portion 16 includes an opening that corresponds to the aperture 32 of the bottom surface 46 of the top member 12. The opening allows for debris to enter the pool skimmer basket 10 through opening 30 of the top member 12 and then collect within the basket portion 16 through opening 32. The emptying device 22 extends through the opening 32 of the basket portion 16 and is rotatably coupled to the bracket 19 of the base member 18 within the basket portion 16.

The handle 20 comprises a locking device 60 that is moveable between a locked position and an unlocked position. The locking device 60 may include an actuator 62, a lock lever 64 with a locking protrusion 66. The actuator 62 is moveable between a first and second position, wherein the first position corresponds to the locked position of the locking device 60 and the second position corresponds to the unlocked position of the locking device 60. For example, the actuator 62 may include a button, wherein depressing the button moves the actuator 62 from the first position to the second position, thereby moving the locking device 60 from the locked to the unlocked position. In the locked position, the lock lever 64 with locking protrusion 66 extends through an aperture 40 in the top surface 13 of the top member and is rotated into a position such that the locking protrusion 66 engages a bottom side of the top surface 13. Depressing the actuator 62 rotates the lock lever 64 and disengages the locking protrusion 66 from the bottom side of top surface 13 of the top member 13. When the locking device 60 is in the unlocked position, the first shaft 23 of the emptying device 22 is free to slide within shaft aperture 50 of the top member 12. The sliding of the first shaft 23 allows the pool skimmer basket 10 to be emptied. The locking device 60 may be biased toward the locked position, wherein a spring or other similar device operates to apply a constant force to move the locking device 60 to the locked position. Further, the locking device 60, when held in the locked position and engaged with the top member 12 of the pool skimmer basket 10, locks the emptying device 22 in a stationary position. This stationary position orients the base member 18 away from the top member 12 in order to form an open space within the basket portion 16. This allows for the pool skimmer basket 10 to collect debris within it while seated within a skimmer body of a pool.

Figure 10:
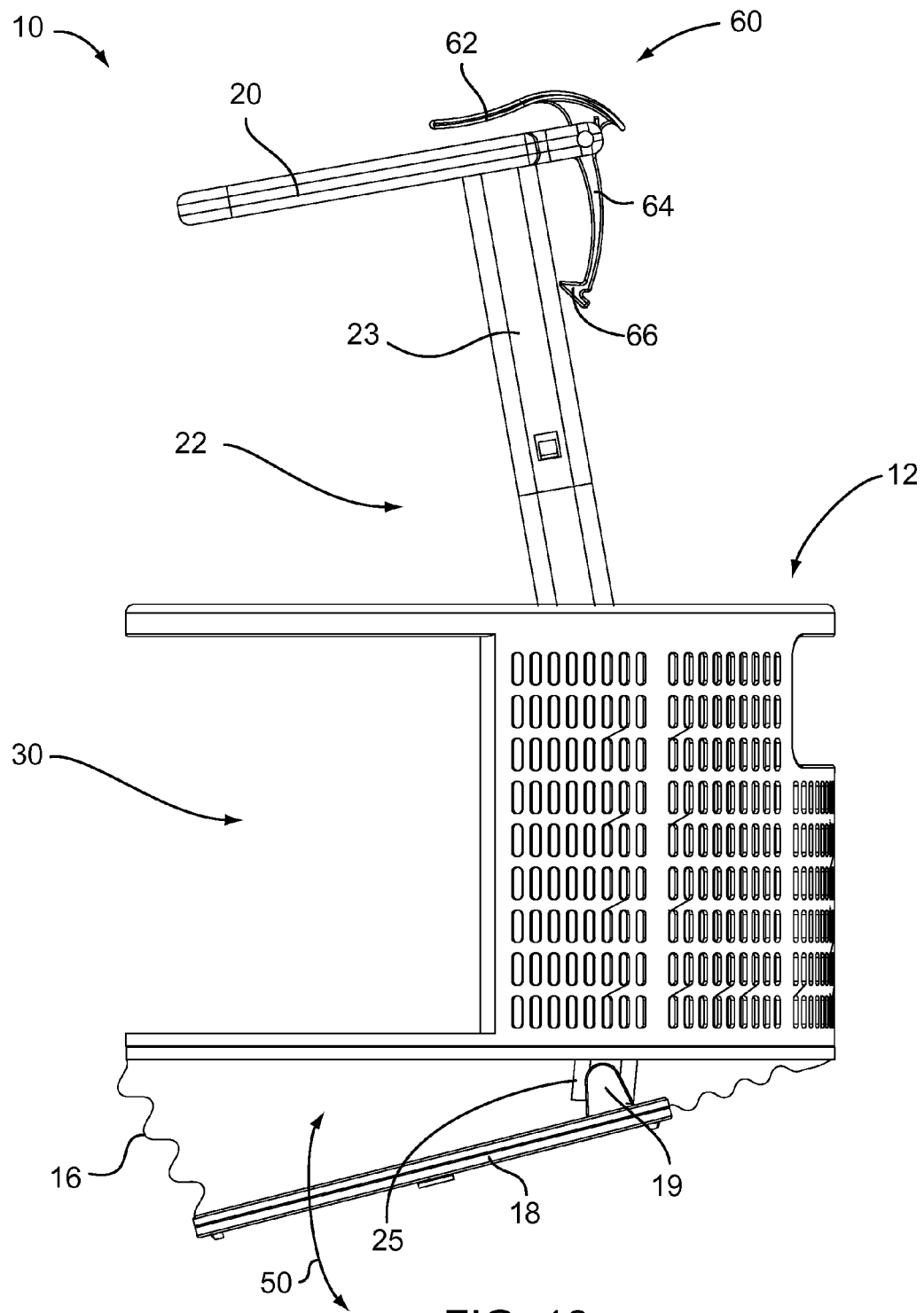
FIG. 10 is a side view of a pool skimmer basket in a collapsed position.

In operation, the pool skimmer basket 10 is large enough to capture all debris entering the skimmer body of the pool and completely containing the debris within the basket portion 16. The pool skimmer basket 10 is removed from the skimmer body by removing the skimmer body lid and grabbing the handle 20 that is located just beneath the skimmer body lid that sits flush with the pool decking The handle 20 of pool skimmer basket 10 sits well above the water line so it is easier than conventional skimmer baskets to grab and remove the entire basket unit by lifting it up and out of the skimmer body. The handle 20 of the pool skimmer basket 10 allows an individual to completely remove the pool skimmer basket 10 without reaching into the water and/or debris. The pool skimmer basket 10 completely captures all debris keeping it from being returned back to the pool or allowing it to be sucked down further into the filtration system. Once the pool skimmer basket 10 is removed from the skimmer body, and with reference to FIG. 10, the locking device 10 is moveable to the unlocked position and the first shaft 23 of the emptying device 22 slides through shaft aperture 50 of the top member 12. As the first shaft 22 slides, the emptying device 22 moves the base member 18 toward the top member 12 and the basket portion 16 is collapsed. The base member 18 rotates with respect to the second shaft 24 in a direction represented by arrow 50 as the second shaft 24 is moved closer to the shaft aperture 50 of the top member 12. This rotation is caused by the angle between the first and second shafts 23 and 24. The rotation of the base member 18 places the base member 18 at an angle, wherein the angle encourages debris toward opening 30 within the top member 12. Accordingly, the components of the pool skimmer basket 10 allows the individual to collapse the basket portion 16 by simply releasing the lever 64 while holding onto the handle 20 so the debris can be emptied without the individual having to reach their hand into the pool skimmer basket 10. When the basket portion 16 is collapsed, the pool skimmer basket 10 is in the collapsed position.

After being emptied the individual simply slides the first shaft 23 to move the base member 18 away from the top member 12 and then moving the locking device 60 into the locked position and engaging the top member 12 to hold the emptying device in a the stationary position. In this condition, the pool skimmer basket 10 is in the extended position and ready to be inserted back into the skimmer body by using the handle 20. Since EZ-Skim completely captures all debris there is nothing left in the skimmer body to get caught beneath the unit upon its return thus saving wear and tear on expensive pool system components.

Figure 11:
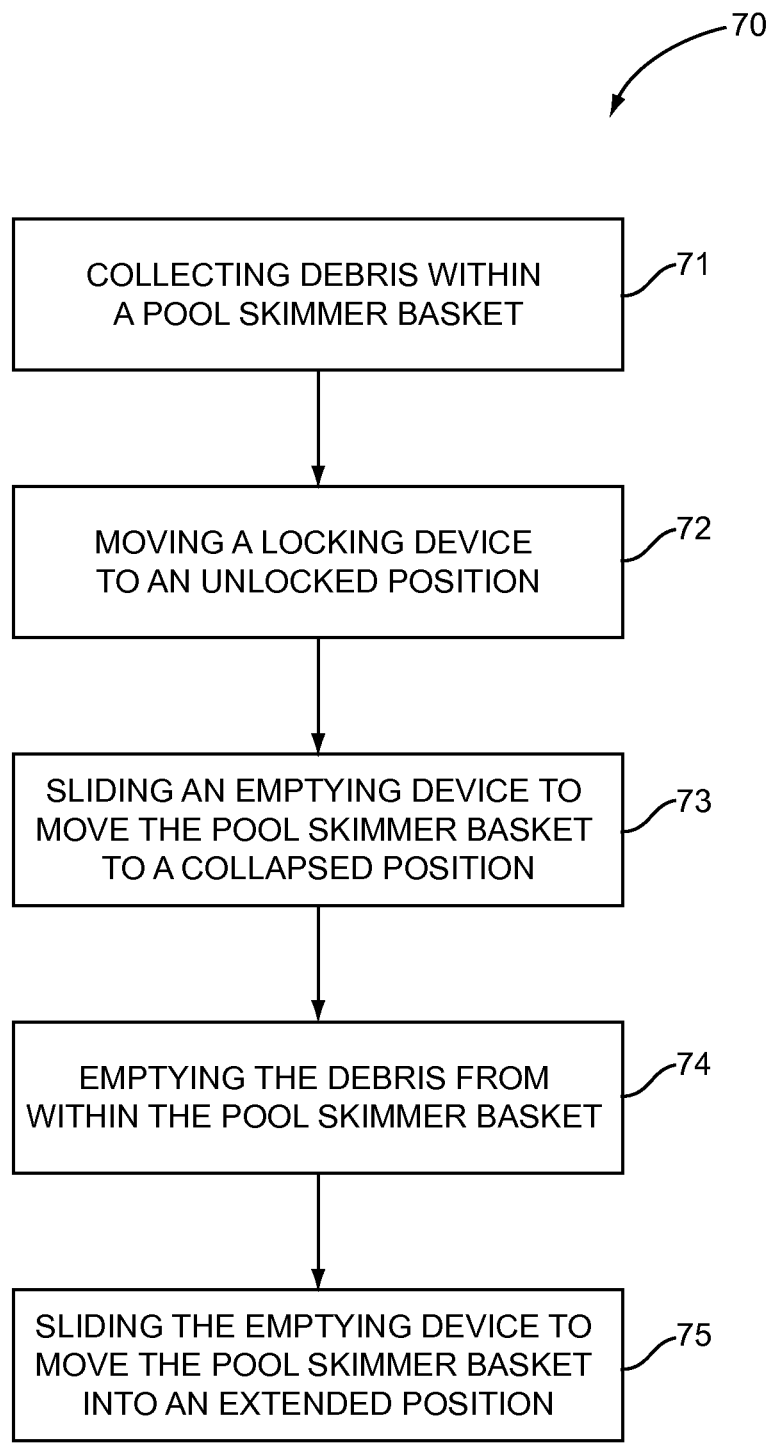
FIG. 11 is a flow chart of a method of using a pool skimmer basket.

Referring again to the drawings, FIG. 11 depicts a method 70 of using a pool skimmer basket 10. The method includes collecting debris within a pool skimmer basket (Step 71); moving a locking device to an unlocked position (Step 72); sliding an emptying device to move the pool skimmer basket to a collapsed position (Step 73); emptying the debris from within the pool skimmer basket through an opening in a top member by angling a base member toward the opening (Step 74); and sliding the emptying device to move the pool skimmer basket into an extended position (Step 75).

Method 70 may include additional steps. For example, Step 72 of moving the locking device to an unlocked position may include a step of depressing an actuator of the locking device. Step 73 of sliding the emptying device to move the pool skimmer basket to the collapsed position may include moving the base member toward the top member to collapse the basket portion of the pool skimmer. Step 75 of moving the pool skimmer basket to the extended position includes moving the base member 18 away from the top member 12 and holding the emptying device 22 in a stationary position thereby retaining the base member 18 a predetermined distance from the top member 12, wherein the emptying device 22 is held in a stationary position by moving the locking device 60 into the locked position and engaging the top member 12.

It will be understood that other method steps may be included, such as removing the pool skimmer basket from a skimmer body of a pool by using the handle; emptying the debris within the pool skimmer basket without having to touch the debris with a user's hand; and inserting the pool skimmer basket within the skimmer body of the pool. Further, the method 70 may also include operating a filtration system of the pool with the pool skimmer basket inserted within the skimmer body.

It will be understood that the components defining any pool skimmer basket may be formed of any of many different types of materials or combinations thereof that can readily be formed into shaped objects provided that the components selected are consistent with the intended operation of a pool skimmer basket. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any pool skimmer basket may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A pool skimmer basket comprising:
   a rigid top member having an opening for receiving and capturing debris into the pool skimmer basket, wherein the top member comprises a shaft aperture;
   a rigid base member having a plurality of apertures;
   a flexible, collapsible basket portion coupled between the top member and the base member; and
   an emptying device coupled between the base member and the top member, wherein:
     the emptying device comprises a first shaft coupled to a second shaft at a predetermined angle, a first end of second shaft rotatably coupled to a bracket of the base member and a second end of the second shaft is coupled to a handle;
     the first shaft is slideable through the shaft aperture of the rigid top member to move the rigid base member toward the rigid top member to place the pool skimmer basket in a collapsed position and move the rigid base member away from the rigid top member to place the pool skimmer basket in an extended position with the rigid base member substantially parallel with a bottom surface of the rigid top member; and
     the flexible, collapsible basket portion is gathered between the rigid base member and the rigid top member and the rigid base member is rotated to an angle with respect to the bottom surface of the rigid top member in response to moving the pool skimmer basket into the collapsed position.

2. The pool skimmer basket of claim 1, wherein the handle operates to lift the pool skimmer basket.

3. The pool skimmer basket of claim 2, further comprising a locking device, wherein the locking device is moveable between and locked and an unlocked position.

4. The pool skimmer basket of claim 3, wherein the pool skimmer basket is moveable into the collapsed position when the locking device is in the unlocked position.

5. The pool skimmer basket of claim 3, wherein the pool skimmer basket is retained in the extended position when the locking device is moved into the locked position and engages the top member of the pool skimmer basket.

6. The pool skimmer basket of claim 1, wherein the extended position comprises the base member retained a predetermined distance away from the top member.

7. The pool skimmer basket of claim 1, wherein the pool skimmer basket is moveable between the extended and collapsed positions in response to the first shaft sliding through the shaft aperture.

8. The pool skimmer basket of claim 7, wherein as the base member is moved toward the top member by sliding the first shaft through the shaft aperture, the base member is rotated toward the opening of the top member.

* * * * *